Aug. 24, 1954     S. J. WALKER     2,687,108

SIGHT GLASS

Filed Nov. 26, 1951

INVENTOR.
Samuel J. Walker
BY
ATTORNEY.

Patented Aug. 24, 1954

2,687,108

UNITED STATES PATENT OFFICE 2,687,108

SIGHT GLASS

Samuel J. Walker, Kansas City, Mo., assignor to Butler Manufacturing Company, Kansas City, Mo., a corporation of Missouri Application November 26, 1951, Serial No. 258,114

3 Claims. (Cl. 116—117)

This invention relates to sight glasses for fluid lines and more particularly to sight glasses with transparent viewing sections.

In previously known sight glasses, the casing enclosing the glass has usually been constructed of metal. As a result of faulty metal to glass seals, provision has had to be made for sealing glands or packings. These packings have necessarily had to be constructed of materials incapable of resisting for any considerable period the corrosive effects of the pipeline fluid. Such sight glass line insertions soon become unserviceable and have to be replaced when the packing materials deteriorate.

Therefore, it is a primary object of my invention to provide a sight glass with a casing which does not require sealing glands or packings constructed of materials incapable of resisting for long periods the corrosive effects of the pipeline fluid.

A further object is to provide a sight glass of simple construction which does not require frequent replacement due to the deterioration of its packings due to the corrosive or deteriorating action of the fluid in the line.

Still another object is to provide a casing for a sight glass which offers adequate protection to the glass without materially affecting the view of the contents of the line.

Other objects and features will appear in the course of the following description of the invention.

Figure 1:
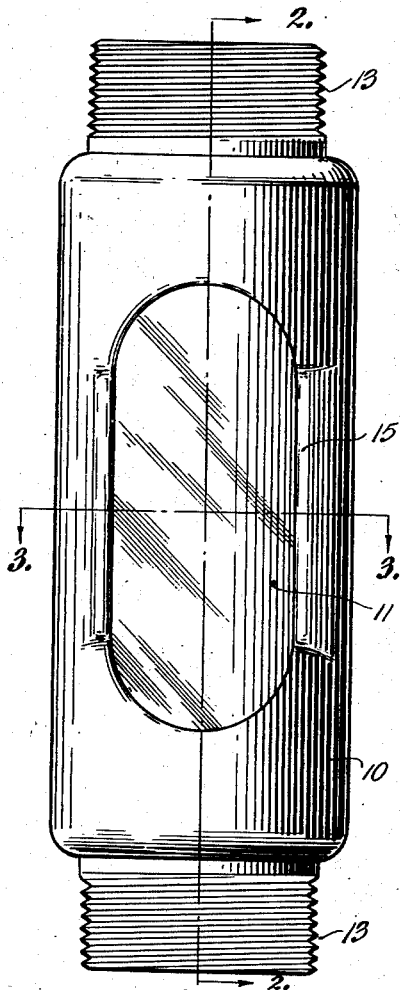
Figure 2:
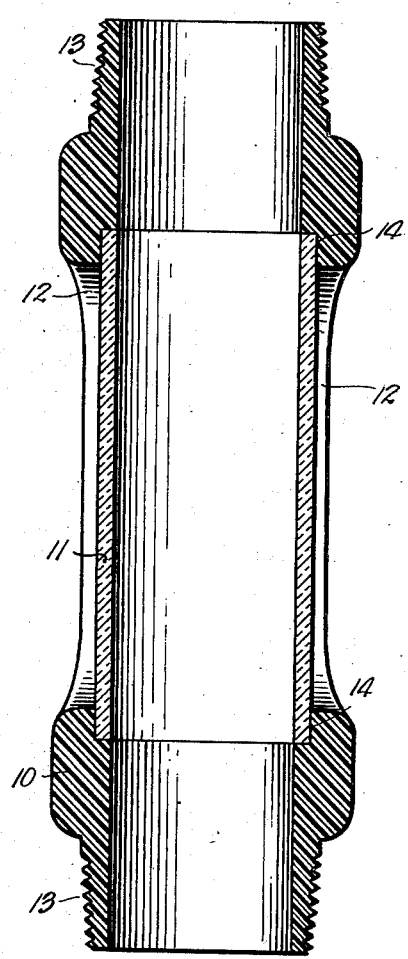
Figure 3:
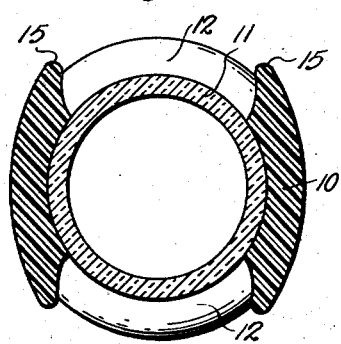
Figure 4:
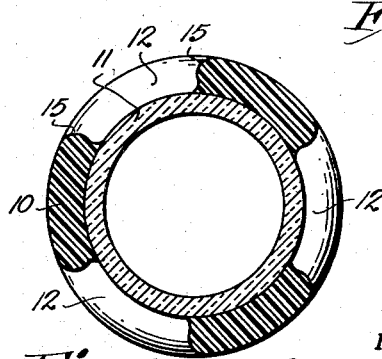

In the drawings which form a part of the specification and wherein like numerals are employed to designate like parts of the various views, Fig. 1 is a side view of a sight glass assembly embodying the invention, Fig. 2 is a view taken along the line 2—2 in Fig. 1 in the direction of the arrows, Fig. 3 is a view taken along the lines 3—3 in Fig. 1 in the direction of the arrows, Fig. 4 is a view similar to that of Fig. 3 but illustrating a sight glass with 3 instead of 2 window openings in the casing.

In the drawings, the numeral 10 is used to indicate the outer casing of the sight glass assembly preferably formed of a plastic material of either the thermoplastic or the thermosetting type. The numeral 11 designates an inner transparent tube preferably formed of glass which is enclosed by the casing 10. Casing 10 is molded to the inner transparent tube 11 in such a manner as to form an integral fluid tight structure.

Window openings 12 are formed in the sides of casing 10 through which the transparent tube 11 and its contents are visible. The preferred form, illustrated in Figs. 1, 2 and 3, has two window openings, but it is intended that any desired number of such openings may be employed. Fig. 4 shows a cross sectional view of the casing having three window openings.

At the extremities of casing 10 are formed threaded ends 13 for attachment to fluid lines or pipes. While threaded ends are illustrated, it is understood that any form of conventional connecting means may be used.

Casing 10 comprises a hollow section having circumferential internal shouldered indentations 14, configured to engage and seal the extremities of tube 11. Thus the casing is molded to the tube in such a manner as to form an integral fluid tight structure.

As tube 11 is usually formed of glass, it is desired to protect it from damaging jars, shocks and scarring which would obscure the view of the contents of the line. For this reason the longitudinal edges 15 of the casing windows are formed to extend past a line tangent to the outer surface of the tube midway between longitudinal edges 15. Therefore, in casings having two window openings, the longitudinal edges 15 are usually constructed with flanged or overlapping portions protruding beyond the boundaries of the casing, as shown in Fig. 3, to avoid the necessity of a thicker casing body or reducing the width of the window opening.

In manufacture of the sight glass the casing 10 may be molded in a single piece about the tube 11 which is placed in the mold as a core piece. Also the casing may be molded about the tube by means of a mold split horizontally or vertically, it being essential only that the mold operation is performed while the tube is contained within the mold in order that a fluid tight seal be established between the tube and casing during the molding operation.

In use this improved type of sight glass is interposed in a fluid line in the conventional manner by means of the threaded ends 13 at its opposite ends.

Through the casing openings 12, the transparent tube 11 and its contents are then visible. The extended longitudinal edges 15 of the window openings 12 protect the tube 11 from the usual shocks and wear. As the sight glass has no perishable parts, it may be left indefinitely in the line.

Thus a sight glass has been provided of simple construction which does not require frequent replacement due to the deterioration of its parts by the corrosive action of the fluid in the line. This type of sight glass is so formed that the casing provides adequate protection to the glass without affecting materially the visual qualities. In addition, the sight glass provided does not require sealing glands or packings constructed of materials incapable of resisting the corrosive effects of the pipeline fluid.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A sight glass for fluid flow lines comprising a transparent tube, a tubular casing open at both ends containing said tube, said casing molded to the side and end surfaces of the tube forming an integral fluid-tight structure and having openings in its sides through which the inner transparent tube and its contents are visible.

2. A sight glass as in claim 1 in which the casing comprises a hollow section having circumferential internal shouldered indentations, said indentations abutting in sealing relationship the side and end surfaces of the tube.

3. A sight glass as in claim 1 in which the longitudinal edges of the casing openings extend past a line tangent to the outer surface of the tube midway between the longitudinal edges.

References Cited in the file of this patent

UNITED STATES PATENTS

| Number | Name | Date |
|---|---|---|
| 1,483,200 | Skold | Feb. 12, 1924 |
| 2,313,889 | Porter | Mar. 16, 1943 |
| 2,409,430 | Greenleaf | Oct. 15, 1946 |